US008175179B2

(12) United States Patent
Baliga et al.

(10) Patent No.: US 8,175,179 B2
(45) Date of Patent: May 8, 2012

(54) CALCULATING PEAK-TO-AVERAGE POWER RATIO REDUCTION SYMBOLS FOR MULTI-CARRIER MODULATED SIGNALS USING A GRADIENT-DESCENT APPROACH

(75) Inventors: Jayant Baliga, West Melbourne (AU); Alexander J. Grant, North Adelaide (AU); Adriel P. Kind, Wentworth Falls (AU); Graeme K. Woodward, Epping (AU)

(73) Assignee: Agere Systems Inc., Allentown, PA (US)

( * ) Notice: Subject to any disclaimer, the term of this patent is extended or adjusted under 35 U.S.C. 154(b) by 482 days.

(21) Appl. No.: 12/377,178

(22) PCT Filed: Sep. 19, 2007

(86) PCT No.: PCT/US2007/078875
§ 371 (c)(1),
(2), (4) Date: Feb. 11, 2009

(87) PCT Pub. No.: WO2008/036727
PCT Pub. Date: Mar. 27, 2008

(65) Prior Publication Data
US 2010/0177832 A1    Jul. 15, 2010

Related U.S. Application Data

(60) Provisional application No. 60/826,158, filed on Sep. 19, 2006, provisional application No. 60/875,270, filed on Dec. 15, 2006.

(51) Int. Cl.
*H04K 1/10* (2006.01)
*H04L 27/28* (2006.01)

(52) U.S. Cl. ........ 375/260; 375/316; 375/324; 375/340; 375/346

(58) Field of Classification Search ............. 375/260, 375/316, 324, 340, 346
See application file for complete search history.

(56) References Cited

U.S. PATENT DOCUMENTS

| | | | | |
|---|---|---|---|---|
| 7,432,838 B2* | 10/2008 | Muck et al. | | 341/138 |
| 7,643,801 B2* | 1/2010 | Piirainen | | 455/114.2 |
| 2005/0238110 A1 | 10/2005 | Yun et al. | | 375/260 |
| 2007/0230597 A1* | 10/2007 | Coon | | 375/260 |
| 2007/0280365 A1 | 12/2007 | Seki | | |

OTHER PUBLICATIONS

"SOCP Approach for OFDM Peak-to-Average Power Ratio Reduction in the Signal Adding Context," by Zidkieta Zabre, et al; XP-031002542; 2006 IEEE International Symposium on Signal Processing and Information Technology, Jan. 2006, pp. 834-839.

"New Techniques for Multicarrier Communication Systems," by Brian Scott Krongold; Thesis, University of Illinois at Urbana-Champaign, 2003, pp. 66-137.

(Continued)

*Primary Examiner* — Ted Wang
(74) *Attorney, Agent, or Firm* — Mendelsohn, Drucker & Associates, P.C.; Craig M. Brown; Steve Mendelsohn (57) ABSTRACT

In one embodiment, the present invention is a method for reducing the peak-to-average power ratio (PAPR) of a multi-carrier modulated symbol, such as an orthogonal frequency division multiplexed (OFDM) symbol. The method first transforms a set of data symbols into a multi-carrier modulated symbol. The method then uses the multi-carrier modulated symbol and a gradient-descent algorithm to generate a set of symbols for PAPR-reduction tones. The data symbols and the PAPR-reduction symbols are then transformed to generate an updated multi-carrier modulated symbol. The PAPR-reduction symbols are iteratively updated until a terminating condition occurs (e.g., an acceptable PAPR is achieved for the multi-carrier modulated symbol). In another embodiment, the method uses the multi-carrier modulated symbol generated in the first step and a gradient-descent algorithm to generate an updated multi-carrier modulated symbol directly, where the need for transforming the data symbols and the PAPR-reduction symbols is eliminated for subsequent iterations.

21 Claims, 5 Drawing Sheets

OTHER PUBLICATIONS

"A Subgradient Algorithm for Low Complexity DMT PAR Minimization," by Alper Erdogan; Acoustics, Speech & Signal Processing, 2004, Proceedings (ICASSP '04) IEEE International Conference, vol. 417-2 (May 2004); pp. IV-1077-IV-1080.

* cited by examiner

CALCULATING PEAK-TO-AVERAGE POWER RATIO REDUCTION SYMBOLS FOR MULTI-CARRIER MODULATED SIGNALS USING A GRADIENT-DESCENT APPROACH

CROSS-REFERENCE TO RELATED APPLICATIONS

This application claims the benefit of the filing dates of U.S. provisional application No. 60/875,270 filed on Dec. 15, 2006, and U.S. provisional application No. 60/826,158 filed on Sep. 19, 2006, the teachings of both of which are incorporated herein by reference.

The subject matter of this application is related to U.S. patent application Ser. No. 12/377,192 filed on the same date the teachings of which are incorporated herein by reference.

BACKGROUND OF THE INVENTION

1. Field of the Invention

The present invention relates to signal processing, and more specifically, to multi-carrier modulation techniques, such as orthogonal frequency division multiplexing (OFDM), used in signal transmission and reception.

2. Description of the Related Art

Multi-carrier modulation techniques, such as orthogonal frequency division multiplexing (OFDM), are used in wired and wireless communication systems such as local area networks, fixed and mobile metropolitan area networks, and cellular phone systems. In general, multi-carrier modulated symbols are generated by dividing a frequency spectrum into smaller frequency subcarriers (a.k.a., tones) and modulating the subcarriers with parts of one or more data signals. The one or more data signals may be acquired from one or more sources (e.g., users), and each multi-carrier modulated symbol may transmit data from more than one source.

Figure 1:
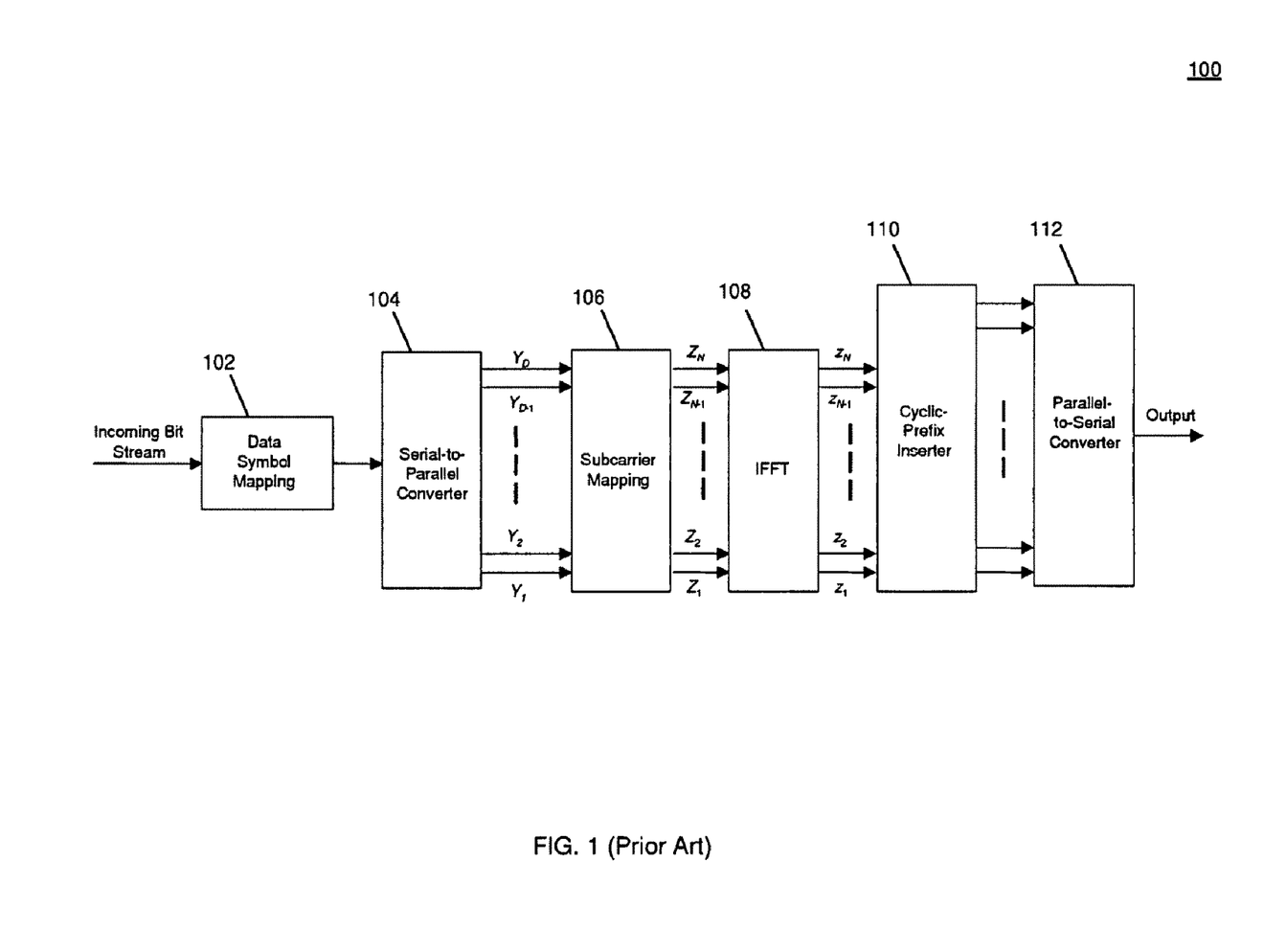
FIG. 1 shows a simplified block diagram of one implementation of a prior-art OFDM transmitter.

FIG. 1 shows a simplified block diagram of one implementation of a prior-art OFDM transmitter 100. Transmitter 100 has data symbol mapper 102, which receives a serial bitstream of digital data from upstream processing. The serial bitstream is divided into groups of bits, and each group is mapped into one or more data symbols to generate a serial stream of data symbols. Mapping may be performed using one or more suitable techniques such as quadrature phase-shift-keying (QPSK) and quadrature amplitude modulation (QAM).

Serial-to-parallel (S/P) converter 104 converts the serial stream of data symbols received from data symbol mapper 102 into D parallel streams of data symbols. Subcarrier mapper 106 assigns the D parallel data symbol streams to N subcarrier frequencies (i.e., tones), where the N subcarrier frequencies are arranged orthogonally to one another. In particular, each parallel data symbol stream is assigned to a separate output of subcarrier mapper 106, where each output corresponds to a different one of the N subcarriers. Note that, for ease of discussion, this implementation assumes that the number D of data symbol streams is equal to the number N of subcarriers. According to other implementations, a number D of data symbols and a number P of pilot symbols may be assigned to the N subcarriers, where there may be a number U of unused (i.e., free) subcarriers, such that N=D+P+U. The N outputs (e.g., $Z=Z_1, \ldots, Z_N$) of subcarrier mapper 106 are then provided to inverse fast Fourier transform (IFFT) processor 108. IFFT processor 108 transforms each set of N outputs from subcarrier mapper 106, where each output in a set corresponds to a different one of the D data symbols, into one OFDM symbol, comprising N time-domain complex numbers (e.g., $z=z_1, \ldots, z_N$).

Each OFDM symbol is then prepared for transmission. First, a cyclic prefix, comprising C complex numbers, is inserted onto each OFDM symbol by cyclic-prefix inserter (CPI) 110. This prefix enables the receiver to cope with signal echoes that result from multi-path reflections. Next, each set of N time-domain complex numbers and each corresponding set of C cyclic prefix complex numbers are converted from parallel to serial format by parallel-to-serial (P/S) converter 112. The output of P/S converter 112 may be further processed using digital-to-analog conversion, radio-frequency modulation, amplification, or other processing suitable for preparing the OFDM symbols for transmission.

During IFFT processing, the data symbols are applied to modulate the corresponding subcarriers, and the modulated subcarriers are added together, often constructively, creating an OFDM symbol with a number of high and low amplitude peaks. Due to the varying nature of the transmitted data, the height of these peaks will typically vary within each OFDM symbol and from one OFDM symbol to the next. Further, some of these peaks can become relatively large compared to the average amplitude level of the OFDM symbol, resulting in a relatively large peak-to-average power ratio (PAPR). The PAPR for an OFDM symbol may be represented as shown in Equation (1) below:

$$PAPR = \frac{\max\limits_{n=1}^{N}(|z_n|^2)}{\frac{1}{N}\sum\limits_{n=1}^{N}|z_n|^2} \qquad (1)$$

In Equation (1), $z_n$ is the $n^{th}$ sample of the OFDM symbol z, and the max function in the numerator determines the largest value of $|z_n|^2$ for $n=1, \ldots, N$.

An OFDM symbol having a relatively large PAPR may become distorted during power amplification. One or more relatively large samples of the OFDM symbol may attempt to drive the output of the amplifier towards its maximum output level. Prior to reaching the maximum output level, the input-to-output relationship of the amplifier may become non-linear resulting in non-linear distortion of the OFDM symbol. When the amplifier's maximum output level is reached, the amplifier clips the sample, resulting in further non-linear distortion of the output signal. Non-linear distortion affects the quality of the signal, and consequently, the receiver may experience difficulties in recovering the transmitted data.

A number of different methods have been employed to reduce the effects of non-linear distortion by the amplifier or eliminate non-linear distortion altogether. In one such method, the transmitter employs a larger amplifier capable of outputting higher power levels. Typically, the larger amplifier is operated with considerable back-off (i.e., the amplifier can be operated at a lower average power) to ensure that the amplifier remains in its linear region of operation even during peak signal events. However, using a larger amplifier in such a manner is inefficient.

In another such method, the transmitter performs amplification in stages to achieve the desired output level. In this method, each stage comprises an amplification step and a filtering step. The amplification step results in relatively minor clipping of the larger samples of each OFDM symbol. The filtering step smoothes out each OFDM symbol to reduce the amount of distortion that occurred in the preceding amplification step. This successive clipping and filtering process is repeated until the desired amplification level is achieved. By amplifying a signal in this manner, the amount of distortion can be reduced over that of an equivalent single-stage amplifier.

In yet another such method, numerous pseudo-random scrambling sequences are applied to the OFDM signal in the frequency-domain (e.g., the output subcarrier mapper 106), and the scrambling sequence that results in the lowest PAPR after IFFT processing is selected. Since the scrambling sequence selected is not known by the receiver, the scrambling sequence may be transmitted to the receiver on another channel, or the sequence may be detected 'blindly' by the receiver. In the later case, the receiver tests all possible sequences and picks the most likely sequence.

Yet further methods, known as tone reservation (TR) methods, attempt to reduce the PAPR for each OFDM symbol. In such methods, a number of frequency subcarriers (i.e., tones) are reserved for transmitting non-data symbols that have the express purpose of reducing PAPRs of OFDM symbols.

Figure 2:
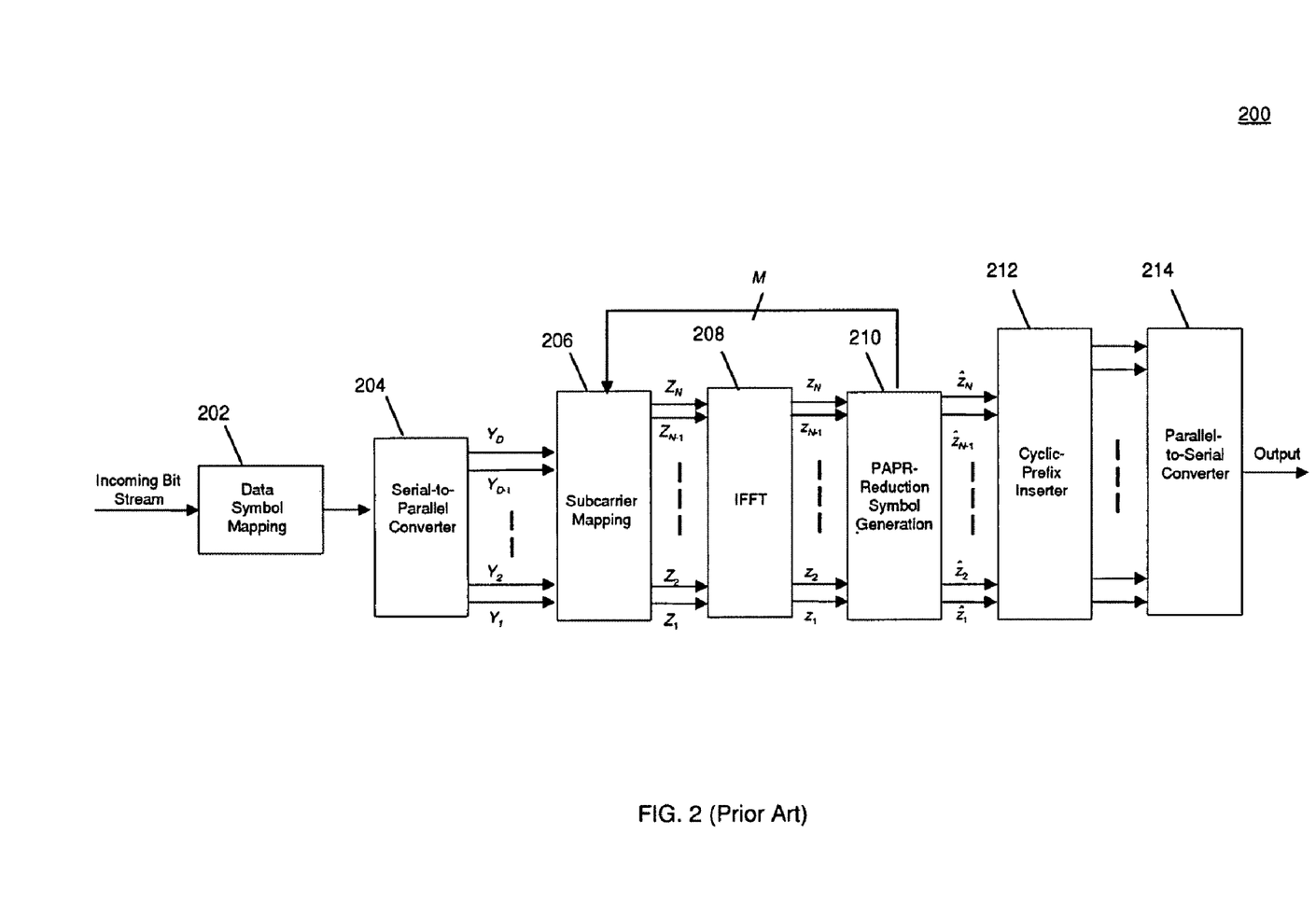
FIG. 2 shows a simplified block diagram of one embodiment of a prior-art OFDM transmitter which uses a tone reservation approach for reducing peak-to-average power ratio (PAPR)

FIG. 2 shows a simplified block diagram of one embodiment of a prior-art transmitter 200 which uses a TR approach for reducing PAPR. Transmitter 200 has data symbol mapper 202 and S/P converter 204, which perform operations analogous to those of the equivalent elements of transmitter 100 to generate sets of D parallel data symbols. Subcarrier mapper 206 assigns each set of D data symbols to a set of N subcarriers such that M subcarriers are not assigned a data symbol. The M subcarriers are reserved a priori for transmitting PAPR-reduction symbols. Note that, in certain embodiments, each set of N subcarriers may be assigned D data symbols and P pilot symbols, where there are a number M of reserved subcarriers and a number U of unused (i.e., free) subcarriers, such that N=D+M+U+P. Each set of N outputs (e.g., Z= $Z_1, \ldots, Z_N$) from subcarrier mapper 206 is provided to IFFT processor 208, which performs operations analogous to those of IFFT processor 108 to transform each set into an OFDM symbol z, comprising N time-domain complex numbers (e.g., z=$z_1, \ldots, z_N$).

PAPR-reduction symbol generator 210 receives each OFDM symbol z and compares the PAPR of each symbol to a specified PAPR threshold value, which represents an acceptable level of PAPR reduction for the OFDM symbol. If the PAPR of an OFDM symbol z is less than the PAPR threshold value, then the OFDM symbol z is output from PAPR-reduction symbol generator 210 as OFDM symbol $\hat{z}$ (i.e., z=$\hat{z}$). If the PAPR of an OFDM symbol exceeds the PAPR threshold value, then PAPR-reduction symbol generator 210 generates a set of M PAPR-reduction symbols using any one of a number of approaches (as discussed in further detail below) and provides the set to subcarrier mapper 206. Note that, in other implementations, PAPR-reduction symbol generator 210 may always generate a set of M PAPR-reduction symbols for each OFDM symbol. In such implementations, the comparison between the PAPR of an OFDM symbol z and a specified PAPR threshold value may be omitted.

Subcarrier mapper 206 assigns the set of M PAPR-reduction symbols to the M PAPR-reduction subcarriers and outputs N complex numbers (e.g., Z=$Z_1, \ldots, Z_N$), which includes the M PAPR-reduction symbols and the D data symbols. The N complex numbers are then transformed by IFFT processor 208 to generate a PAPR-reduced version of OFDM symbol z, which is provided to PAPR-reduction symbol generator 210. This process is repeated until the PAPR of the PAPR-reduced OFDM symbol z is less than the PAPR threshold value, and, once this condition occurs, the PAPR-reduced OFDM symbol z is output from PAPR-reduction symbol generator 210 as OFDM symbol $\hat{z}$ (i.e., z=$\hat{z}$). Each OFDM symbol $\hat{z}$ is then prepared for transmission using cyclic-prefix inserter 212 and P/S converter 214, which perform operations analogous to those of the equivalent elements of transmitter 100, and any other processing suitable for preparing OFDM symbols for transmission.

By assigning PAPR-reduction symbols to reserved tones, the peak values of time-domain OFDM symbols may be reduced without affecting the individual data symbols. The designer of an OFDM transmitter has a large degree of freedom to select PAPR-reduction symbols to assign to reserved tones, and numerous methods have been employed for selecting symbols that will sufficiently reduce PAPRs. One such approach for selecting PAPR-reduction symbols involves performing iterative combinatorial searches. As an example of a combinatorial approach, suppose a transmitter modulates data using 16-quadrature amplitude modulation (16-QAM) and reserves 8 tones for PAPR-reduction symbols. The transmitter will consider $16^8$ different combinations of PAPR-reduction symbols to place, on the reserved tones of each OFDM symbol, and will select the combination of symbols that generates the lowest PAPR.

SUMMARY OF THE INVENTION

In one embodiment, the present invention is a computer-implemented method for reducing peak-to-average power ratio (PAPR) of a transmitter's multi-carrier modulated signal. The method generates an initial multi-carrier modulated signal having (i) one or more data-modulated tones corresponding to one or more data symbols and (ii) one or more initial PAPR-reduction tones corresponding to one or more initial PAPR-reduction symbols. The method then applies a gradient-descent algorithm to the initial multi-carrier modulated signal to generate a final multi-carrier modulated signal having (i) the one or more data-modulated tones corresponding to the one or more data symbols and (ii) one or more final PAPR-reduction tones corresponding to one or more final PAPR-reduction symbols, wherein the PAPR of the final multi-carrier modulated signal is lower than the PAPR of the initial multi-carrier modulated signal.

In another embodiment, the present invention is an apparatus for performing the method described above. The apparatus comprises an inverse fast Fourier transform (IFFT) processor and a PAPR-reduction symbol generator. The IFFT processor is adapted to generate the initial multi-carrier modulated signal, and the PAPR-reduction symbol generator is adapted to apply the gradient descent-algorithm to the initial multi-carrier modulated signal to generate the final multi-carrier modulated signal, wherein the PAPR of the final multi-carrier modulated signal is lower than the PAPR of the initial multi-carrier modulated signal.

In yet another embodiment, the present invention is an apparatus for performing the method described above. The apparatus comprises a means for generating the initial multi-carrier modulated signal and a means for applying a gradient-descent algorithm to the initial multi-carrier modulated signal to generate the final multi-carrier modulated signal, wherein the PAPR of the final multi-carrier modulated signal is lower than the PAPR of the initial multi-carrier modulated signal.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

DETAILED DESCRIPTION

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As described in the background, a number of different techniques have been developed for determining peak-to-average power ratio (PAPR)-reduction symbols to place on reserved tones (i.e., reserved a priori for transmitting PAPR-reduction symbols). These methods achieve varying degrees of effectiveness in reducing the peak values (i.e., the numerator of Equation (1)), and thus overall PAPRs, of multi-carrier modulated symbols. Some techniques, such as those that perform combinatorial searches, are capable of selecting near-optimal PAPR symbols; however, these techniques often involve a relatively large number of calculations. Other techniques select PAPR-reduction symbols using heuristic approaches that often lead to low levels of performance. Instead of selecting symbols to assign to PAPR-reduction tones by performing combinatorial searches or by employing trial-and-error approaches, near-optimal PAPR-reduction symbols can be directly calculated using an iterative gradient-descent algorithm. Furthermore, the iterative gradient-descent algorithm can be used to calculate PAPR-reduction symbols that reduce one or more samples of an multi-carrier modulated symbol, as opposed to reducing only the largest peak.

Figure 3:
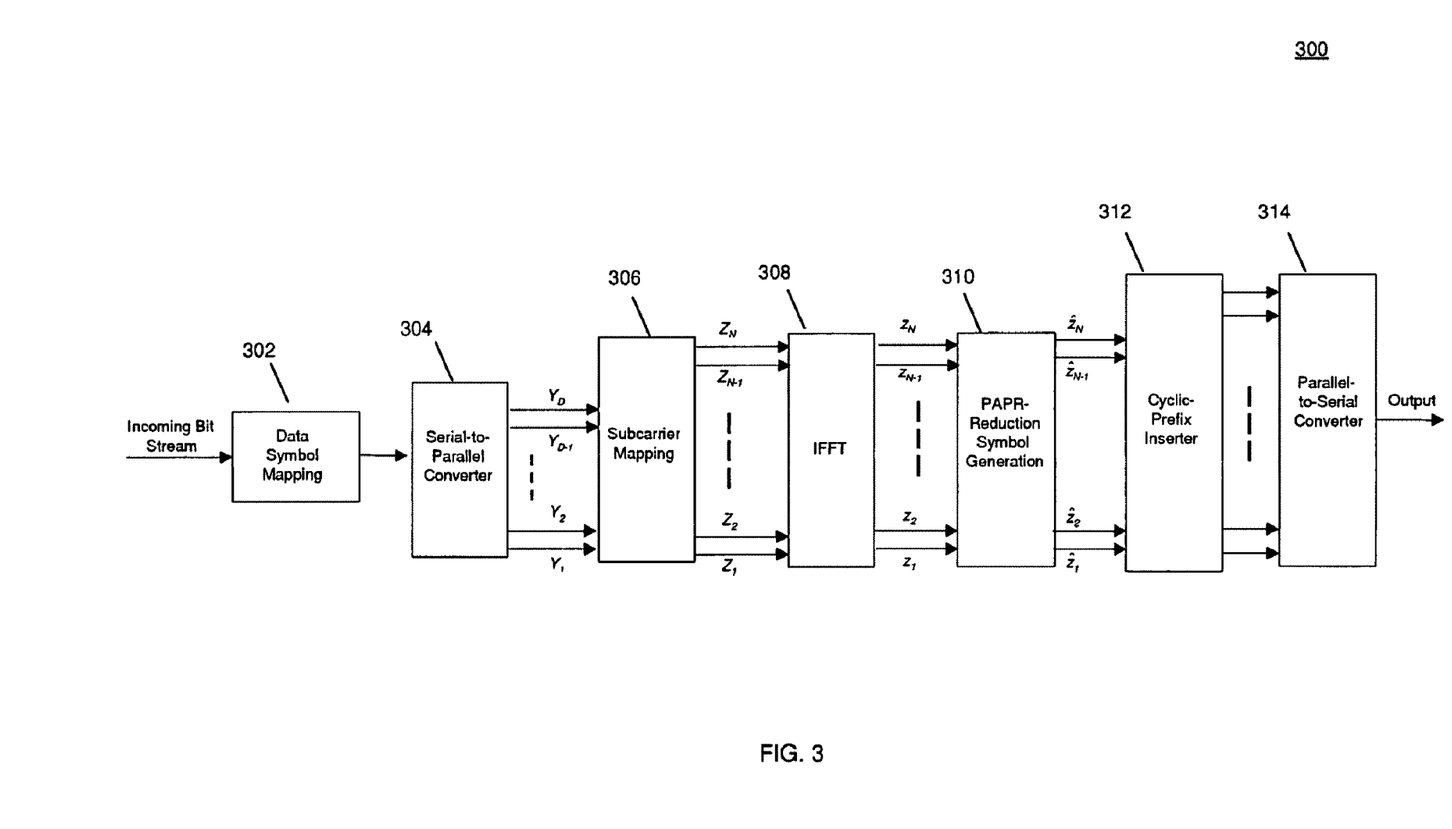
FIG. 3 shows a simplified block diagram of an OFDM transmitter according to one embodiment of the present invention which uses a gradient-descent algorithm for reducing PAPR.

FIG. 3 shows a simplified block diagram of an OFDM transmitter 300 according to one embodiment of the present invention which uses a gradient-descent algorithm for reducing PAPR. Transmitter 300 has data symbol mapper 302, serial-to-parallel converter 304, subcarrier mapper 306, and IFFT processor 308, which perform operations analogous to those of the equivalent elements of transmitter 200 of FIG. 2 to generate an initial OFDM symbol z for each set of N outputs of subcarrier mapper 306 (e.g., corresponding to D data symbols and M zero-valued PAPR-reduction symbols), wherein each initial OFDM symbol z comprises N time-domain complex numbers (e.g., $z=z_1, \ldots, z_N$).

PAPR-reduction symbol generator 310 receives initial OFDM symbol z and compares the PAPR of initial OFDM symbol z to a specified PAPR threshold value, which represents an acceptable level of PAPR reduction for the OFDM symbol. If the PAPR of initial OFDM symbol z is less than the PAPR threshold value, then initial OFDM symbol z is output from PAPR-reduction symbol generator 310 as final OFDM symbol $\hat{z}$ (i.e., $z=\hat{z}$). If the PAPR of initial OFDM symbol z exceeds the PAPR threshold value, then PAPR-reduction symbol generator 310 implements an iterative gradient-descent algorithm to generate final OFDM symbol $\hat{z}$, having up to M non-zero PAPR-reduction symbols (as discussed in further detail below). Note that, according to other embodiments, PAPR-reduction symbol generator 310 may always implement an iterative gradient-descent algorithm to generate final OFDM symbol $\hat{z}$. In such embodiments, the comparison between the PAPR of an initial OFDM symbol z and a specified PAPR threshold value may be omitted. Final OFDM symbol $\hat{z}$ is then prepared for transmission using cyclic-prefix inserter 312 and parallel-to-serial converter (P/S) converter 314, which perform operations analogous to those of the equivalent elements of transmitter 200 of FIG. 2. Similar to transmitter 200, final OFDM symbol $\hat{z}$ may be further processed using digital-to-analog conversion, radio-frequency modulation, amplification, or other processing suitable for preparing OFDM symbols for transmission.

One gradient-descent algorithm that may be used by PAPR-reduction symbol generator 310 is represented by Equation (2) below:

$$X(i+1)=X(i)-\mu \nabla J(X(i)) \quad (2)$$

According to Equation (2), an updated set X(i+1) of PAPR-reduction symbols is calculated during each iteration i of PAPR-reduction symbol generator 310 based on a prior set X(i) of PAPR reduction symbols, a step size $\mu$, and the gradient $\nabla J(X(i))$ of a cost function J(X(i)).

In this case, the gradient-descent algorithm attempts to minimize the numerator of Equation (1) (i.e., the square of the sample of the time-domain OFDM symbol with the largest magnitude). To generate a cost function J(X(i)) of which a gradient may be taken, the numerator of Equation (1) is represented as a function that approximates the numerator as shown in Equation (3):

$$J(X(i)) = \frac{1}{\alpha}\ln\left(\sum_{n=1}^{N} \exp(\alpha|z_n(X(i))|^2)\right) \approx \max_{n=1}^{N}|z_n(X(i))|^2 \quad (3)$$

where $\alpha$ is a scalar constant $\geq 1$, z(X(i)) is the time-domain OFDM symbol for the $i^{th}$ iteration, N is the number of samples in the time-domain OFDM symbol z(X(i)), and $z_n(X(i))$ is the $n^{th}$ sample of the time-domain OFDM symbol z(X(i)). The time-domain OFDM symbol z(X(i)) may be expressed as a function of the set X(i) of frequency-domain PAPR-reduction symbols as shown in Equation (4) below:

$$z(X(i))=z+\hat{Q}X(i) \quad (4)$$

In this equation, z is the initial OFDM symbol, $\hat{Q}$ is the N×M sub-matrix of the N×N IFFT matrix Q that corresponds to the PAPR-reduction tones, and M is the number of tones used for PAPR reduction.

Finding the gradient $\nabla_j(J(i))$ of the cost function J(X(i)) of Equation (3) yields Equation 5) as follows:

$$\nabla_j (J(i)) = \frac{\sum_{n=1}^{N} \exp|\alpha z_n(X(i))|^2 [2z_n(X(i))f_{n,j}^*]}{\sum_{n=1}^{N} \exp|\alpha z_n(X(i))|^2} \quad (5)$$

where j refers to the $j^{th}$ element of the gradient vector and $f_n = [f_{n,1}, f_{n,2}, \ldots, f_{n,M}]$ is the $n^{th}$ row of the matrix $\hat{Q}$. Further, the gradient of Equation (5) can be rewritten in vector form as shown in Equation (6) by noting that all terms except $f_{n,j}$ are independent of j and by replacing $f_{n,j}$ with $f_n^\dagger$, where † denotes the Hermitian transpose.

$$\nabla J(X(i)) = \frac{\sum_{n=1}^{N} \exp|\alpha z_n(X(i))|^2 [2z_n(X(i))f_n^\dagger]}{\sum_{n=1}^{N} \exp|\alpha z_n(X(i))|^2} \quad (6)$$

In practical implementations, exponentials can be relatively difficult to compute, resulting in increased complexity of the system. To reduce this complexity, Equation (6) can be modified by removing the sample with the largest magnitude (i.e., $z_{d(1)}$) from the exponents in both numerator and denominator as a common term as shown in Equation (7):

$$\nabla J(X(i)) = \frac{2\left[z_{d(1)}(i)f_{d(1)}^\dagger + \sum_{n=2}^{N} e^{\alpha(|z_{d(n)}(i)|^2 - |z_{d(1)}(i)|^2)} z_{d(n)}(i) f_{d(n)}^\dagger \right]}{1 + \sum_{n=2}^{N} e^{\alpha(|z_{d(n)}(i)|^2 - |z_{d(1)}(i)|^2)}} \quad (7)$$

where d(1) is the largest value of $|z_n|$, and d(n) is the $n^{th}$ largest value of $|z_n|$. As a result, the exponents $\alpha(|z_{d(n)}(i)|^2 - |z_{d(1)}(i)|^2)$ in both the numerator and the denominator will have negative values. Consequentially, the exponentials $e^{\alpha(|z_{d(n)}(i)|^2 - |z_{d(1)}(i)|^2)}$ in the numerator and the denominator will be within the interval of [0, 1] and, thus, they can be stored in a relatively small look-up table (LUT).

Figure 4:
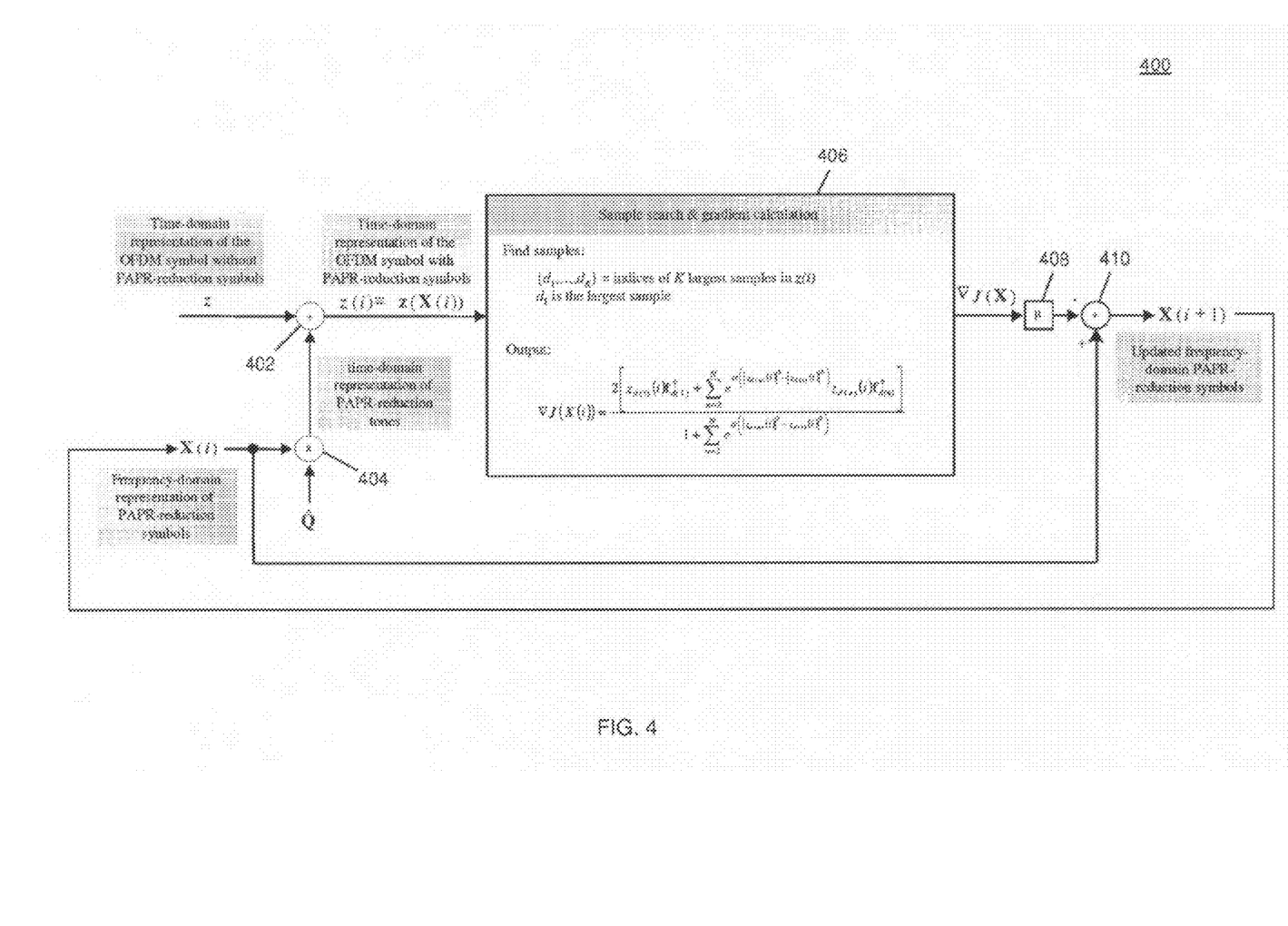
FIG. 4 shows a simplified block diagram of a PAPR-reduction symbol generator according to one embodiment of the present invention, which may be used to implement the PAPR-reduction symbol generator of the transmitter of FIG. 3.

FIG. 4 shows a simplified block diagram of PAPR-reduction symbol generator 400 according to one embodiment of the present invention which may be used to implement PAPR-reduction symbol generator 310 of transmitter 300 of FIG. 3. PAPR-reduction symbol generator 400 has adder 402 and multiplier 404, which together perform Equation (4) to generate an updated time-domain OFDM symbol z(X(i)) for each iteration i. PAPR-reduction symbol generator 400 receives an initial OFDM symbol z from IFFT processor 308 of transmitter 300, and, for the first iteration i, PAPR-reduction symbol generator 400 may initialize each symbol in the set of M frequency-domain PAPR-reduction symbols (i.e., $X(i) = X_1(i), \ldots, X_M(i)$) to zero. According to alternative embodiments, each PAPR-reduction symbol in the set may be initialized to some other value. The initialized set X(i) of PAPR-reduction symbols is provided to multiplier 404 where the set is multiplied by the N×M sub-matrix $\hat{Q}$ to generate a time-domain representation of the PAPR-reduction tones. The time-domain PAPR-reduction tones and the initial OFDM symbol z are then added together by adder 402 to generate an updated time-domain OFDM symbol z(X(i)). Note that, by adding the time-domain PAPR-reduction tones to the initial OFDM symbol z, the set of D data symbols is IFFT transformed only once.

Gradient calculator 406 receives the updated OFDM symbol z(X(i)), searches for the sample $z_{d(1)}$ with the largest magnitude, and calculates the PAPR of the updated OFDM symbol z(X(i)) using the sample $z_{d(1)}$. The PAPR of the updated OFDM symbol z(X(i)) is compared to a specified PAPR threshold value, and, if the PAPR of the updated OFDM symbol z(X(i)) is less than the PAPR threshold value, then the updated OFDM symbol z(X(i)) is output from PAPR-reduction symbol generator 400 as the final OFDM symbol $\hat{z}$ (i.e., $z(X(i)) = \hat{z}$). If the PAPR of the updated OFDM symbol z(X(i)) exceeds the PAPR threshold value, then gradient calculator 406, multiplier 408, and adder 410 operate together to perform the update of Equation (2). First, gradient calculator 406 generates gradient $\nabla J(X(i))$ using Equation (7) and a LUT that stores the values of the exponentials $e^{\alpha(|z_{d(n)}(i)|^2 - |z_{d(1)}(i)|^2)}$ in the numerator and the denominator of Equation (7). In so doing, gradient calculator 406 subtracts the sample $z_{d(1)}$ with the largest magnitude from the summations in both the numerator and denominator as shown in Equation (7). Multiplier 408 multiplies gradient $\nabla J(X(i))$ by step size µ and adder 410 subtracts this product from the previous set X(i) of PAPR-reduction symbols to generate an updated set X(i+1) of PAPR-reduction symbols. Note that, according to other embodiments, gradient calculator 406, multiplier 408, and adder 410 may always perform the update of Equation (2) to generate an updated set X(i+1) of PAPR-reduction symbols. In such embodiments, the comparison between the PAPR of an updated OFDM symbol z(X(i)) and a specified PAPR threshold value may be omitted.

The updated set X(i+1) of PAPR-reduction symbols is then provided to multiplier 404, and this process may be repeated until a specified terminating condition occurs. For example, the update loop can be terminated after an acceptable PAPR is achieved, after a specified number of updates have been performed, or after another suitable terminating condition occurs. Once the terminating condition occurs, the current updated OFDM symbol z(X(i)) is output from PAPR-reduction symbol generator 400 as the final OFDM symbol $\hat{z}$ (i.e., $z(X(i)) = \hat{z}$), and the final OFDM symbol $\hat{z}$ is provided to cyclic prefix inserter 312 of FIG. 3.

According to various embodiments of the present invention, the complexity of the gradient calculation performed by gradient calculator 406 may be reduced by reducing the number of summations in the numerator and denominator of Equation (7). Specifically, instead of calculating the numerator and denominator using all N time-domain samples, gradient calculator 406 may search for a number K of samples less than N, where the samples used may be the K samples with the largest magnitude (i.e., $d_1, \ldots, d_K$) and may perform the summations of Equation (7) using only those K samples. Since the magnitude of the samples may change from one iteration to the next, the location of the K samples used in the update algorithm may change from one iteration to the next. Additionally, the number K of samples used in these summations may be selected based on balancing factors such as greater PAPR reduction vs. the lower computational complexity.

In one embodiment, gradient calculator 406 may search for the sample with the largest magnitude for each iteration and generate an updated set X(i+1) of PAPR-reduction symbols based on the sample with the largest magnitude for the iteration. In this embodiment, update Equation (2) is simplified, and may be rewritten as shown in Equation (8) below:

$$X(i+1) = X(i) - 2\mu z(i)_{p(i)} f_{p(i)}^\dagger \quad (8)$$

where p(i) is the index of the sample $z_n$ having the largest magnitude for the $i^{th}$ iteration. Note that, in this embodiment, as the PAPR-reduction symbols are updated, the sample $z(i)_{p(i)}$ with the largest magnitude may be reduced such that the magnitude of one or more other samples becomes larger. Further, as the sample $z(i)_{p(i)}$ with the largest magnitude is reduced, the magnitude of one or more other samples could be increased such that it increases the PAPR above an acceptable level. As a result, a greater number of iterations may need to be performed, compared to an embodiment that uses multiple samples, to achieve an acceptable PAPR.

Searching for the K samples with the largest magnitude can be computationally expensive, as it could, for example, be determined by sorting all N samples. Alternative embodiments of the present invention may be envisioned in which gradient calculator 406 selects samples based upon a threshold. In such embodiments, gradient calculator 406 may select the number K of samples used in Equation (7) based on the number of samples whose magnitudes are above the threshold. Since the number of samples whose magnitudes are above the threshold may change from one iteration to the next, the number K of samples selected for use in Equation (7) may also change from one iteration to the next.

According to the embodiment of FIG. 4, after a set X(i+1) of updated PAPR-reduction symbols is generated, the set is transformed into the time domain and added to the initial time-domain OFDM symbol z in order to determine if an acceptable PAPR is achieved. Thus, IFFT processing (i.e., multiplier 404) is used for each iteration to determine the effect that the set X(i+1) of updated PAPR-reduction symbols has on the PAPR of the OFDM symbol. According to other embodiments of the present invention, a gradient-descent algorithm can generate an updated time-domain OFDM symbol entirely in the time domain, thereby eliminating the need to perform an IFFT transformation during each iteration.

A gradient-descent algorithm that may be used by PAPR-reduction symbol generator 310 to generate an updated OFDM symbol z(i+1) entirely in the time domain is represented by Equation (9) below:

$$z(i+1)=z(i)-\mu \nabla J(z(i)) \quad (9)$$

By modifying Equation (7), gradient $\nabla J(z(i))$ can be generated as shown in Equation (10) below:

$$\nabla J(z(i)) = \frac{2\left[z_{d(1)}(i)g_{d(1)} + \sum_{n=2}^{N} e^{\alpha(|z_{d(n)}(i)|^2 - |z_{d(1)}(i)|^2)} z_{d(n)}(i)g_{d(n)}\right]}{1 + \sum_{n=2}^{N} e^{\alpha(|z_{d(n)}(i)|^2 - |z_{d(1)}(i)|^2)}} \quad (10)$$

where, $G=[g_1, \ldots, g_N]=\hat{Q}\hat{Q}^\dagger$, which effectively is the discrete Fourier transform (DFT) of the $f_n^\dagger$ vectors with respect to the reserved tones.

Figure 5:
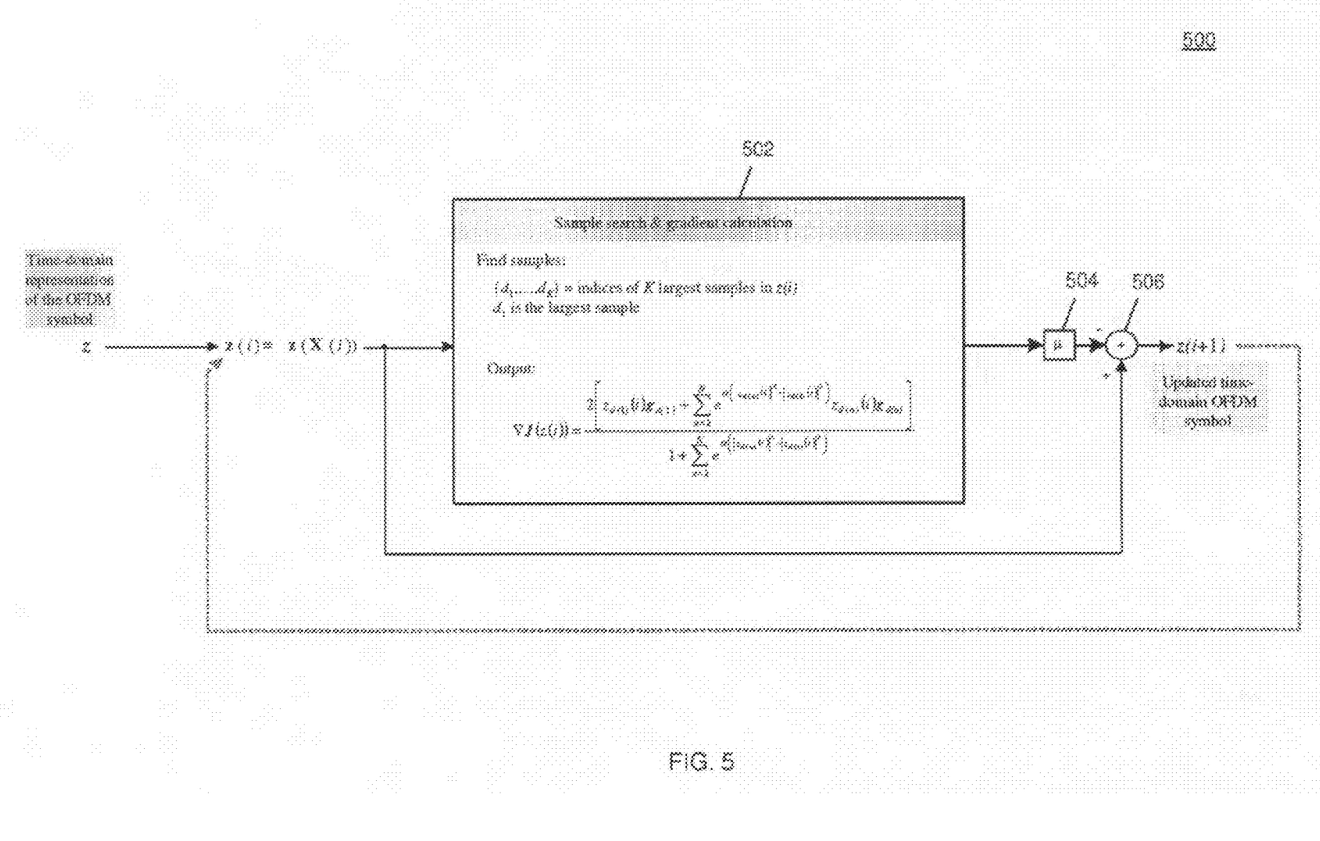
FIG. 5 shows a simplified block diagram of a PAPR-reduction symbol generator according to another embodiment of the present invention, which may be used to implement the PAPR-reduction symbol generator of the transmitter of FIG. 3.

FIG. 5 shows a simplified block diagram of PAPR-reduction symbol generator 500 according to another embodiment of the present invention, which may be used to implement PAPR-reduction symbol generator 310 of transmitter 300 of FIG. 3. Gradient calculator 502 receives the initial time-domain OFDM symbol z, searches for the sample $z_{d(1)}$ of the initial OFDM symbol z with the largest magnitude, and calculates the PAPR of the initial OFDM symbol z using the identified sample $z_{d(1)}$. The PAPR of the initial OFDM symbol z is compared to a specified PAPR threshold value, and, if the PAPR of the initial OFDM symbol z is less than the PAPR threshold value, then the initial OFDM symbol z is output from PAPR-reduction symbol generator 500 as the final OFDM symbol $\hat{z}$ (i.e., $z=\hat{z}$). If the PAPR of the initial OFDM symbol z exceeds the PAPR threshold value, then gradient calculator 502, multiplier 504, and adder 506 operate together to perform the update of Equation (9). Specifically, gradient calculator 502 calculates gradient $\nabla J(z(i))$ using Equation (10), multiplier 504 multiplies gradient $\nabla J(z(i))$ by a specified step size $\mu$, and adder 506 subtracts this product from the initial OFDM symbol z to generate an updated OFDM symbol z(i+1) as shown in Equation (9). Note that, according to other embodiments, gradient calculator 502, multiplier 504, and adder 506 may always perform the update of Equation (9) to generate an updated OFDM symbol z(i+1). In such embodiments, the comparison between the PAPR of an initial OFDM symbol z and a specified PAPR threshold value may be omitted.

The updated OFDM symbol z(i+1) is fed back to the input of gradient calculator 502, and this process is repeated until a specified terminating condition occurs. For example, the update loop can be terminated after an acceptable PAPR is achieved, after a specified number of updates have been performed, or after another suitable terminating condition occurs. Once the terminating condition occurs, the current OFDM symbol z(i) is output from PAPR-reduction symbol generator 500 as the final OFDM symbol $\hat{z}$ (i.e., $z(i)=\hat{z}$), and the final OFDM symbol $\hat{z}$ is provided to cyclic prefix inserter 312 of FIG. 3.

Similar to the alternative embodiments described previously for PAPR-reduction symbol generator 400 of FIG. 4, alternative embodiments of PAPR-reduction symbol generator 500 may be envisioned in which gradient calculator 502 searches for a number K of samples less than N, where the samples used are preferably the K samples with the largest magnitude (i.e., $d_1, \ldots, d_K$), and may perform the summations of Equation (10) using only those K samples. According to one embodiment that selects the sample with the largest magnitude, the gradient calculation of Equation (9) may be simplified such that the OFDM symbol is updated using Equation (11) as follows:

$$z(i+1)=z(i)-2\mu z(i)_{p(i)} g_{p(i)} \quad (11)$$

where p(i) is the index of the sample $z_n$ with the largest magnitude for the $i^{th}$ iteration. Additionally, alternative embodiments may be envisioned that select the K samples based on a threshold in a manner similar to that of the comparable alternative embodiments of PAPR-reduction symbol generator 400 discussed above.

It will be understood that various changes in the details, materials, and arrangements of the parts that have been described and illustrated in order to explain the nature of this invention may be made by those skilled in the art without departing from the scope of the invention as expressed in the following claims. For example, PAPR-reduction symbol generator 400 of FIC. 4 may be modified such that each updated set X(i+1) of PAPR-reduction symbols is provided to subcarrier mapper 306 of FIG. 3. Then, for each iteration, IFFT 308 may transform each set of N outputs from subcarrier mapper 306, including M PAPR-reduction symbols and D data symbols, into an OFDM symbol z, and provide the OFDM symbol z directly to gradient calculator 406, in which case, multiplier 404 and adder 402 may be omitted. As another example, the gradients calculated by gradient calculators 406 and 502 may be performed using variations of Equations (7) and (10) that may be made by those skilled in the art (e.g., using Equation (6) without a LUT instead of using Equation (7)).

The various gradient-descent approaches discussed above may be used to generate PAPR-reduction signals for free tones, reserved tones, or both free and reserved tones. Additionally, the various gradient-descent approaches discussed above may be used in conjunction with the methods for dynamically selecting PAPR-reduction techniques to reduce distortion in OFDM signals as taught by U.S. patent application Ser. No. 12/377,192 filed on the same date as this application as attorney docket no. Woodward 8.

As used in the claims, the term "reserved tones" refers to tones reserved a priori for PAPR reduction. All other tones, including pilot tones, are unreserved.

As used in the claims, the term "gradient-descent algorithm" refers to an algorithm comprising defining a differentiable function of the amplitude of a multi-carrier modulated (e.g., OFDM) signal and then iterating based on a derivative (e.g., gradient) of the cost function to find an optimal value.

While the present invention was described relative to its use with OFDM modulation techniques, the present invention is not so limited. The present invention may also be extended to other multi-carrier modulation techniques such as digital subscriber line (DSL) techniques, coded OFDM techniques, or any other suitable multi-carrier modulation technique.

The present invention may be implemented as circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing blocks in a software program. Such software may be employed in, for example, a digital signal processor, microcontroller, or general-purpose computer.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

We claim:

1. A processor-implemented method for reducing peak-to-average power ratio (PAPR) of a transmitter's multi-carrier modulated signal, the method comprising:
   (a) at least one processor generating an initial multi-carrier modulated signal having (i) one or more data-modulated tones corresponding to one or more data symbols and (ii) one or more initial PAPR-reduction tones corresponding to one or more initial PAPR-reduction symbols; and
   (b) at least one processor applying, to the initial multi-carrier modulated signal, a gradient-descent algorithm to generate a final multi-carrier modulated signal having (i) the one or more data-modulated tones corresponding to the one or more data symbols and (ii) one or more final PAPR-reduction tones corresponding to one or more final PAPR-reduction symbols, wherein the PAPR of the final multi-carrier modulated signal is lower than the PAPR of the initial multi-carrier modulated signal.

2. The processor-implemented method of claim 1, wherein the multi-carrier modulated signal, the initial multi-carrier modulated signal, and the final multi-carrier modulated signal are orthogonal frequency division multiplexed (OFDM) signals.

3. The processor-implemented method of claim 1, wherein each of the one or more initial PAPR-reduction symbols is zero.

4. The processor-implemented method of claim 1, wherein the gradient-descent algorithm comprises:
   (b1) determining one or more largest samples in the initial multi-carrier modulated signal;
   (b2) applying the one or more largest samples to a gradient of a cost function, which is based on amplitude of the multi-carrier modulated signal; and
   (b3) updating the multi-carrier modulated signal based on the gradient of the cost function.

5. The processor-implemented method of claim 4, wherein step (b1)-(b3) are repeated one or more times until a specified terminating condition occurs.

6. The processor-implemented method of claim 5, wherein the specified terminating condition occurs when the PAPR of the updated multi-carrier modulated signal is less than a specified PAPR threshold level.

7. The processor-implemented method of claim 4, wherein the cost function J approximates the peak power in a multi-carrier modulated signal z and is given by:

$$J = \frac{1}{\alpha} \ln\left(\sum_{n=1}^{N} \exp(\alpha |z_n|^2)\right);$$

$\alpha$ is a scalar constant;
$z_n$ is an $n^{th}$ element of the multi-carrier modulated signal z; and N is a number of samples in the multi-carrier modulated signal z.

8. The processor-implemented method of claim 7, wherein the gradient-descent algorithm is:

$$X(i+1)=X(i)-\mu \nabla J(X(i));$$

i is the iteration number of the gradient-descent algorithm;
X(i+1) is one or more updated PAPR-reduction symbols;
X(i) is one or more PAPR-reduction symbols generated during a previous iteration;
$\mu$ is a step size;
J(X(i)) is a cost function; and
$\nabla J(X(i))$ is a gradient of the cost function J(X).

9. The processor-implemented method of claim 8, wherein the gradient $\nabla J(X(i))$ of the cost function J(X(i)) is:

$$\nabla J(X) = \frac{2\left[z_{d(1)}f_{d(1)}^{\dagger} + \sum_{n=2}^{K} e^{\alpha(|z_{d(n)}|^2 - |z_{d(1)}|^2)} z_{d(n)} f_{d(n)}^{\dagger}\right]}{1 + \sum_{n=2}^{K} e^{\alpha(|z_{d(n)}|^2 - |z_{d(1)}|^2)}};$$

$|z_n(X(i))|$ is an absolute value of the $n^{th}$ element of the multi-carrier modulated signal z(X(i));
d(1) is a largest sample of $|z_n(X(i))|$;
d(n) is an $n^{th}$ largest sample of $|z_n(X(i))|$;
K is an integer less than or equal to N;
Q is an N×N matrix of an inverse-fast-Fourier transformation (IFFT) where N is both a column length and a row length of the IFFT;
$\hat{Q}$ is an N×M sub-matrix of Q;
M is a number of the one or more PAPR-reduction tones;
$f_n=[f_{n,1}, f_{n,2}, \ldots, f_{n,M}]$ is an $n^{th}$ row of the matrix $\hat{Q}$; and
$\dagger$ denotes a Hermitian transpose.

10. The processor-implemented method of claim 9, wherein K corresponds to a number of samples in the multi-carrier modulated signal whose magnitudes are greater than a specified threshold value.

11. The processor-implemented method of claim 7, wherein the gradient-descent algorithm is:

$$z(i+1)=z(i)-\mu \nabla J(z(i));$$

i is the iteration number of the gradient-descent algorithm;
z(i) is an multi-carrier modulated signal during an $i^{th}$ iteration;
z(i+1) is an updated multi-carrier modulated signal for an $i+1^{th}$ iteration;
$\mu$ is a step size;
J(z(i)) is a cost function; and
$\nabla J(z(i))$ is a gradient of the cost function.

12. The processor-implemented method of claim 11, wherein the gradient of the cost function is:

$$\nabla J(z(i)) = \frac{2\left[z_{d(1)}g_{d(1)} + \sum_{n=2}^{K} e^{\alpha(|z_{d(n)}(i)|^2 - |z_{d(1)}(i)|^2)} z_{d(n)}(i) g_{d(n)}\right]}{1 + \sum_{n=2}^{K} e^{\alpha(|z_{d(n)}(i)|^2 - |z_{d(1)}(i)|^2)}}$$

$|z_n(X(i))|$ is an absolute value of an $n^{th}$ element of the multi-carrier modulated signal z(X(i));
d(1) is a largest sample of $|z_n(X(i))|$;
d(n) is an $n^{th}$ largest sample of $|z_n(X(i))|$;
K is an integer less than or equal to N;
Q is an N×N matrix of an inverse-fast-Fourier transformation (IFFT) where N is both a column length and a row length of the IFFT;
$\hat{Q}$ is an N×M sub-matrix of Q;
M is a number of the one or more PAPR-reduction tones;
$G=[g_1, \ldots, g_N]=\hat{Q}\hat{Q}^{\dagger}$; and
$\dagger$ denotes a Hermitian transpose.

13. The processor-implemented method of claim 12, wherein K corresponds to a number of samples in the multi-carrier modulated signal whose magnitudes are greater than a specified threshold value.

14. The processor-implemented method of claim 1, wherein each of the one or more PAPR-reduction tones is a free tone unreserved a priori by the transmitter having no data applied to it or a reserved tone reserved a priori by the transmitter for PAPR reduction.

15. An apparatus for reducing peak-to-average power ratio (PAPR) of a transmitter's multi-carrier modulated signal, the apparatus comprising:
an IFFT processor adapted to generate an initial multi-carrier modulated signal having (i) one or more data-modulated tones corresponding to one or more data symbols and (ii) one or more initial PAPR-reduction tones corresponding to one or more initial PAPR-reduction symbols; and
a PAPR-reduction symbol generator adapted to apply, to the initial multi-carrier modulated signal, a gradient-descent algorithm to generate a final multi-carrier modulated signal having (i) the one or more data-modulated tones corresponding to the one or more data symbols and (ii) one or more final PAPR-reduction tones corresponding to one or more final PAPR-reduction symbols, wherein the PAPR of the final multi-carrier modulated signal is lower than the PAPR of the initial multi-carrier modulated signal.

16. The apparatus of claim 15, wherein the multi-carrier modulated signal, the initial multi-carrier modulated signal, and the final multi-carrier modulated signal are orthogonal frequency division multiplexed (OFDM) signals.

17. The apparatus of claim 15, wherein the PAPR-reduction symbol generator is adapted to implement the gradient-descent algorithm to:
(b1) determine one or more largest samples in the initial multi-carrier modulated signal;
(b2) apply the one or more largest samples to a gradient of a cost function, which is based on amplitude of the multi-carrier modulated signal; and
(b3) update the multi-carrier modulated signal based on the gradient of the cost function.

18. The apparatus of claim 17, wherein the cost function J approximates the peak power in an multi-carrier modulated signal z and is given by:

$$J = \frac{1}{\alpha} \ln\left(\sum_{n=1}^{N} \exp(\alpha|z_n|^2)\right);$$

$\alpha$ is a scalar constant;
$z_n$ is an $n^{th}$ element of the multi-carrier modulated signal z; and
N is a number of samples in the multi-carrier modulated signal z.

19. The apparatus of claim 18, wherein the gradient-descent algorithm is:

$$X(i+1)=X(i)-\mu \nabla J(X(i));$$

i is the iteration number of the gradient-descent algorithm;
X(i+1) is one or more updated PAPR-reduction symbols;
X(i) is one or more PAPR-reduction symbols generated during a previous iteration;
$\mu$ is a step size;
J(X(i)) is a cost function; and
$\nabla J(X(i))$ is a gradient of the cost function J(X).

20. The apparatus of claim 18, wherein the gradient-descent algorithm is:

$$z(i+1)=z(i)-\mu \nabla J(z(i));$$

i is the iteration number of the gradient-descent algorithm;
z(i) is an multi-carrier modulated signal during an $i^{th}$ iteration;
z(i+1) is an updated multi-carrier modulated signal for an $i+1^{th}$ iteration;
μ is a step size;
J(z(i)) is a cost function; and
∇J(z(i)) is a gradient of the cost function.

21. An apparatus for reducing peak-to-average power ratio (PAPR) of a transmitter's multi-carrier modulated signal, the apparatus comprising:

(a) means for generating an initial multi-carrier modulated signal having (i) one or more data-modulated tones corresponding to one or more data symbols and (ii) one or more initial PAPR-reduction tones corresponding to one or more initial PAPR-reduction symbols; and (b) means for applying, to the initial multi-carrier modulated signal, a gradient-descent algorithm to generate a final multi-carrier modulated signal having (i) the one or more data-modulated tones corresponding to the one or more data symbols and (ii) one or more final PAPR-reduction tones corresponding to one or more final PAPR-reduction symbols, wherein the PAPR of the final multi-carrier modulated signal is lower than the PAPR of the initial multi-carrier modulated signal.

* * * * *